US005176945A

United States Patent [19]

Brayton

[11] Patent Number: 5,176,945

[45] Date of Patent: Jan. 5, 1993

[54] TRANSFER SHEET FOR USE IN PRINTING OPERATIONS AND HAVING COMPENSATION FOR DIMENSIONAL INSTABILITY

[75] Inventor: Donald E. Brayton, Woodland Park, Colo.

[73] Assignee: Honeywell Inc., Minneapolis, Minn.

[21] Appl. No.: 600,793

[22] Filed: Oct. 22, 1990

[51] Int. Cl.[5] .......... B32B 3/24

[52] U.S. Cl. .......... 428/136; 428/131; 428/40; 428/914; 428/195; 428/338; 428/220; 428/913; 101/301; 156/235; 156/240

[58] Field of Search .......... 428/131, 136, 40, 914, 428/195, 338, 220, 913; 101/301; 156/235, 240

[56] References Cited

U.S. PATENT DOCUMENTS 4,070,967 1/1978 Schlau et al. .......... 101/301
4,262,059 4/1981 Frankowski .......... 428/597
4,390,580 6/1983 Donovan et al. .......... 428/172
4,870,434 9/1989 Nogishi et al. .......... 346/160

*Primary Examiner*—Donald J. Loney
*Assistant Examiner*—William P. Watkins
*Attorney, Agent, or Firm*—Edward Schwarz

[57] ABSTRACT

A transfer sheet for use in printing of patterns such as alphanumeric characters onto a keyboard or other workpiece from the transfer sheet where the patterns are originally formed has a realignment area in which a plurality of slits are formed. The slits allow at least one portion of the transfer sheet to be repositioned with respect to at least one other portion to improve alignment of the patterns with respect to the workpiece. The patterns may become misaligned because of inherent dimensional instability of the transfer sheet arising from temperature or humidity variations.

11 Claims, 2 Drawing Sheets

TRANSFER SHEET FOR USE IN PRINTING OPERATIONS AND HAVING COMPENSATION FOR DIMENSIONAL INSTABILITY

BACKGROUND OF THE INVENTION

In certain types of printing operations, particularly those using what is known as the sublimation process, a transfer sheet is prepared with patterns formed on it of the ink to be used in the printing operation. The transfer sheet is laid on the surface to be printed and heat and pressure is applied to the transfer sheet to vaporize the ink forming the patterns and cause the patterns to become permanently embedded in the surface to be printed. One of the particularly useful applications for sublimation printing is to place the characters and other patterns on the keys of keyboards for desktop and laptop computers.

It is particularly efficient to print all of the keys for a single keyboard simultaneously with a transfer sheet arranged so that individual patterns correspond to the final position of the pattern in the keyboard. The blank keys are carried in some kind of alignment support which may be the actual keyboard frame itself when presented to the apparatus which performs the actual printing operation. In such a case, it is important that the patterns on the transfer sheet are precisely alined with the keytops when the printing occurs. To aid in this alignment, there are registration pins carried in the printing apparatus with respect to which both the alignment support and the transfer sheet are positioned. It is convenient to provide registration apertures in the transfer sheet spaced apart from the patterns themselves and through which pass the registration pins when the transfer sheet is placed in contact with the keytops to thereby allow the transfer sheet to be aligned with the keytops.

As anyone who has access to a personal computer keyboard can easily determine, the maximum horizontal distance between two keytops on such a keyboard can easily be in excess of 16 in. (37 cm.). The paper or other material from which the transfer sheet is formed is not dimensionally stable when subjected to humidity or temperature changes, and its dimension can in a typical production situation change in length as much as 5 to 10 parts per thousand. Thus it is possible that patterns at one or another part of the keyboard may be out of alignment as much as 0.15 inch, or nearly 0.4 cm. Such misalignment is unacceptable. Presently, such out of alignment keyboards are reworked or discarded which is expensive and inconvenient. There is therefore a need to correct this misalignment in some way.

This characteristic of paper has been recognized in the past. For example U.S. Pat. No. 4,870,434 uses a detector to sense the edge of each segment of a fanfold paper stack to assure that each segment is printed in accurate alignment with the edge even if the paper has changed length due to effects of humidity or temperature.

It is also known to provide grooves in articles such as flooring panels to provide relief of stresses arising from absorption of moisture, see U.S. Pat. No. 4,390,580.

BRIEF DESCRIPTION OF THE INVENTION

A transfer sheet for printing a workpiece and formed of a single sheet of dimensionally unstable material has a plurality of registration apertures. The transfer sheet carries a plurality of patterns, each of which to be transferred to a precisely preselected position on a workpiece surface such as a plurality of keytops while in surface contact therewith. The actual printing process requires the application of heat to the transfer sheet while firmly pressing each area of the transfer sheet carrying a pattern to be printed against the keytops. Individual dies having the shape of the keytops are used to apply pressure to each pattern area. Because the keytops are in general not flat, typically a resilient backing sheet is interposed between the pattern areas on the transfer sheet and the dies. Each of the patterns is initially formed on the transfer sheet in a precisely preselected position with respect to at least two registration apertures. The printing apparatus positions the keyboard or other workpiece surface in a precisely preselected position with respect to a plurality of registration pins whose positions correspond to the registration apertures of the transfer sheet. During a printing operation, the transfer sheet is positioned with reference to these registration pins by use of these registration apertures.

The transfer sheet of the invention accommodates changes in the position of patterns on the transfer sheet with respect to the registration apertures due to dimensional instability of the transfer sheet, by providing in the transfer sheet a realignment area having a plurality of staggered and overlapping slits approximately transverse to a preselected dimension, preferably the long dimension, of the transfer sheet. Each of the areas of the transfer sheet bordering the realignment area which has a pattern should also have at least two registration apertures or some other feature by which the area can be positioned accurately with respect to the workpiece. The slits of the realignment area must extend completely to the edges of the transfer sheet so that each edge along the preselected dimension is broken in at least one place by a slit.

In a preferred embodiment, the transfer sheet's realignment area includes at least two sets of slits spaced apart from each other along two approximately parallel lines. Ideally in this case, a plurality of slits of one line is in staggered relation to slits of the one or two adjacent lines.

Accordingly, a main purpose of this invention is to permit more accurate positioning of the patterns printed in relatively widely spaced locations on a workpiece such as a keyboard.

DESCRIPTION OF THE PREFERRED EMBODIMENTS

Figure 1:
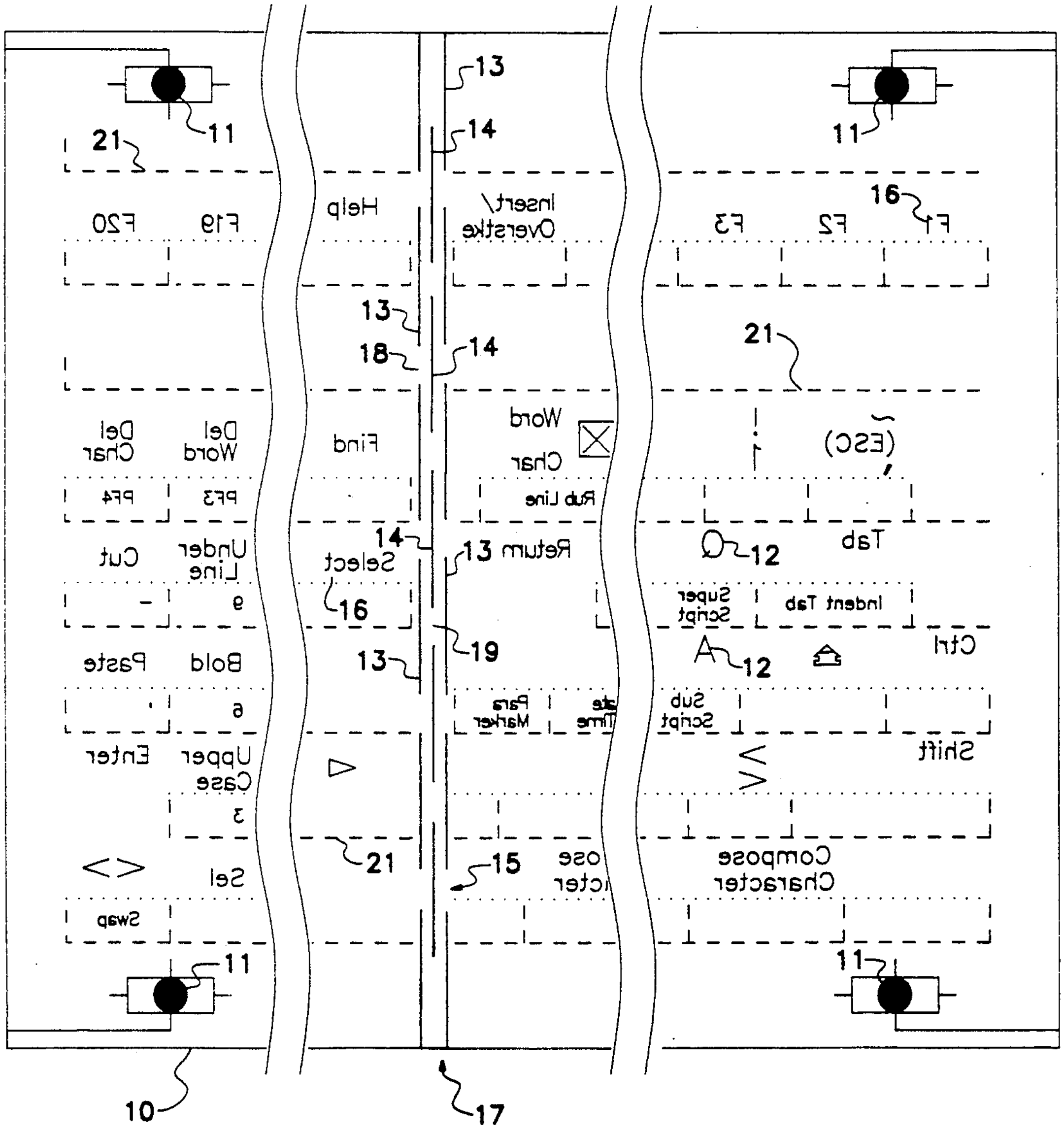
FIG. 1 is a depiction of a full size transfer sheet with certain sections thereof omitted.

In FIG. 1, a full size depiction of a representative transfer sheet 10 has certain sections omitted for reasons of convenience. The back side of transfer sheet 10 is shown in FIG. 1 facing the viewer with patterns 12, 16 printed on it shown in mirror image. Thus, the images appear normally oriented if viewed from the front side, i.e. through the material such as paper from which the transfer sheet 10 is formed. The back (facing) side of transfer sheet 10 is placed against keytops of a keyboard having blank keys so that by the application of heat and pressure to them through transfer sheet 10, the patterns 12, 16 will transfer themselves in normal image into the keytops. Most of the area of transfer sheet 10 has printed on it these individual patterns 12, 16 which in this example may either be alphanumeric characters as at 12 or function key legends as at 16. The long dimension of transfer sheet 10 can be considered to be horizontal with respect to the viewer of FIG. 1.

The transfer sheet 10 has a realignment area 15 which can be considered to extend generally along a series of individual spaced apart slits 13 and 14 from the top edge to the bottom edge of transfer sheet 10 as shown and generally transverse to the long dimension of transfer sheet 10. The realignment area 15 can be considered to divide the transfer sheet 10 shown into two individual pattern areas each containing substantial numbers of individual patterns. These pattern areas are located generally to the left and right of realignment area 15 and border same. Each of these pattern areas has at least one pattern to be imprinted onto the individual keytops. Each of these pattern areas is shown as having at least two registration apertures 11 which are used for alignment purposes. This invention requires that each of these pattern areas bordering a realignment area 15 has at least two registration apertures 11 or some other means by which the transfer sheet 10 area can be accurately positioned with respect to the keytop or other workpiece.

The slits 13 and 14 within and defining the position of realignment area 15 are preferably straight line slits that are aligned with and spaced apart from each other with bridges 18 of unslit transfer sheet 10 material interposed between and defining the ends of adjacent slits 13 and bridges 19 between adjacent slits 14. In my preferred commercial embodiment, the slits are arranged as shown with two sets of slits 13 formed of straight lines and extending along approximately parallel lines. Interposed between the two sets of slits 13 is a third set of slits 14 which also extends along a straight line with bridges of transfer sheet 10 material defining the individual slits 14. The straight line along which the slits 14 extend is also parallel to the lines along which sets of slits 13 lie. The individual slits 14 are staggered with respect to the individual slits 13, so that the bridges 18 are approximately aligned with the centers of slits 14. Similarly, the bridges 19 defining the ends of slits 14 are approximately aligned with the centers of slits 13. At least one slit 13 or 14 must extend to the very edge of the transfer sheet as is shown at 15 in FIG. 1. This is necessary to allow the printing areas separated by a realignment area to freely translate with respect to each other.

In a commercial embodiment of this invention, the sets of slits 13 are spaced from the set of slits 14 by approximately 0.25 cm. Individual slits 13 and 14 are each approximately 2.5 cm long, and the bridges 18 and those between individual slits 14 are approximately 0.5 cm., although these dimensions can be easily varied. Although the commercial embodiment has but a single realignment area 15, it is possible to place a realignment area anywhere there are no patterns to be transferred to the workpiece However, if registration apertures 11 are used for alignment of the patterns, there should be at least two of these apertures 11 in each pattern area defined by a realignment area 15.

Figure 2:
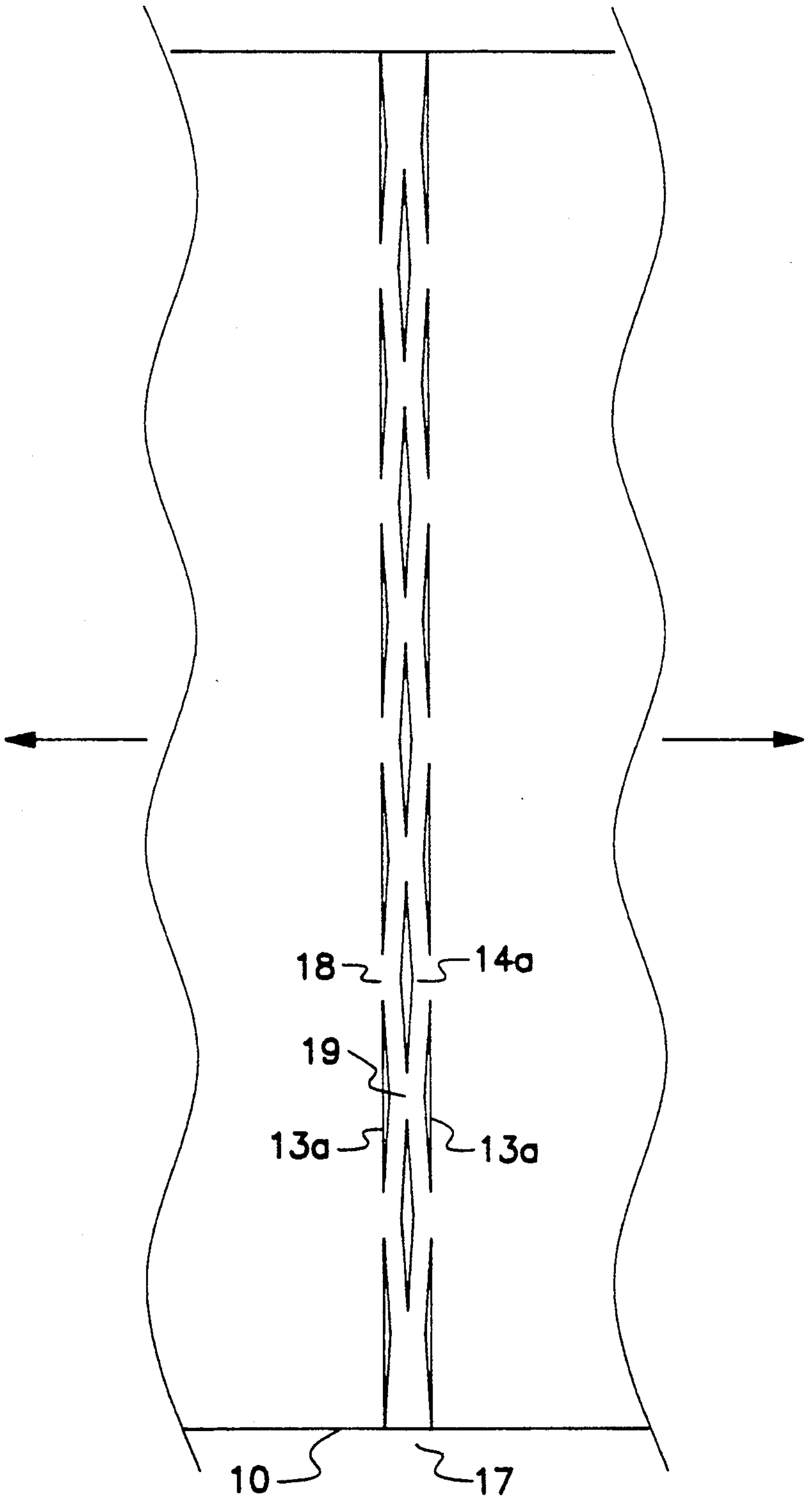
FIG. 2 shows a realignment area with individual slits distorted because of tensile stress.

FIG. 2 shows what happens if say, a change of humidity causes the transfer sheet 10 to shrink. Individual slits 13 and 14 are distorted into the shapes shown, although one should understand that the shapes are somewhat exaggerated. One can see that registration errors induced by this shrinkage can be reduced by 40-50%, which is frequently enough to avoid the need for scrapping or reworking the keyboard Similarly, expansion of transfer sheet 10 is accommodated, and registration of the patterns is improved and the potential for wrinkling of transfer sheet 10 is reduced.

I claim:

1. In a transfer sheet formed of a single sheet of dimensionally unstable material having first and second opposite edges and a plurality of registration apertures, and on which transfer sheet is formed a plurality of patterns, each pattern for transfer to a precisely preselected position on a workpiece surface while in surface contact herewith responsive to application of at least one of heat and pressure, and each said pattern initially in a precisely preselected position with respect to at least two registration apertures, said workpiece surface in a precisely preselected position with respect to a plurality of registration pins whose locations correspond to the registration apertures of the transfer sheet, an improvement in the transfer sheet for accommodating changes in the position of patterns on the transfer sheet with respect to the registration apertures due to dimensional instability of the transfer sheet, comprising in the transfer sheet a realignment area having a plurality of slits substantially transverse to a preselected dimension of the transfer sheet, the realignment area extending between the first and the second opposite edges and defining two individual pattern areas each bordering the realignment area, each pattern area containing a plurality of patterns, wherein the realignment area includes at least one slit intersecting each of the first and second transfer sheet edges, each area of the transfer sheet bordering the realignment area having at least one registration aperture by which the area can be positioned accurately with respect to the workpiece.

2. The transfer sheet of claim 1, wherein the realignment area includes a plurality of straight line slits aligned with and spaced apart from each other.

3. The transfer sheet of claim 2, wherein the realignment area includes at least two sets of slits spaced apart from each other along two approximately parallel lines.

4. The transfer sheet of claim 2, wherein the realignment area includes least two sets of slits spaced apart from each other along two substantially parallel lines, and wherein a plurality of slits of one line is in staggered relation to slits of the other line.

5. The transfer sheet of claim 4, wherein the realignment area includes least two sets of slits spaced apart from each other approximately 0.15 cm.

6. The transfer sheet of claim 4, wherein the realignment area includes a third set of slits approximately 2.5 cm. long extending along a third line between and approximately parallel to the two approximately parallel lines and spaced from each set of the two sets of slits by approximately 0.7 cm., wherein the slits extending along the third line are in staggered relation to slits of the other two sets of slits.

7. The transfer sheet of claim 1, wherein each area of the transfer sheet bordering the realignment area includes at least two registration apertures.

8. The transfer sheet of claim 1, wherein each area of the transfer sheet defined by the realignment area includes two registration apertures.

9. The transfer sheet of claim 1, wherein the transfer sheet has a long dimension, and wherein the slits in the realignment area are extend substantially perpendicular to the long dimension.

10. The transfer sheet of claim 9, wherein the realignment area includes at least one slit intersecting each transfer sheet edge approximately parallel to the direction of the preselected dimension.

11. The transfer sheet of claim 1, wherein at least one area bordering the realignment area includes at least two registration apertures.

* * * * *